US012704663B2

(12) United States Patent
Lee et al.

(10) Patent No.: US 12,704,663 B2
(45) Date of Patent: Aug. 11, 2026

(54) PROTECTION FILM STRUCTURE WITH COMPOSITE HARDENING LAYER

(71) Applicant: SUPERC-TOUCH CORPORATION, New Taipei City (TW)

(72) Inventors: Hsiang-Yu Lee, New Taipei City (TW); Shang Chin, New Taipei City (TW); Ping-Tsun Lin, New Taipei City (TW)

(73) Assignee: SUPERC-TOUCH CORPORATION, New Taipei City (TW)

(*) Notice: Subject to any disclaimer, the term of this patent is extended or adjusted under 35 U.S.C. 154(b) by 209 days.

(21) Appl. No.: 18/731,496

(22) Filed: Jun. 3, 2024

(65) Prior Publication Data

US 2025/0012950 A1 Jan. 9, 2025

(30) Foreign Application Priority Data

Jul. 4, 2023 (TW) ................................ 112124957

(51) Int. Cl.

| | |
|---|---|
| ***G02B 1/14*** | (2015.01) |
| ***B32B 3/08*** | (2006.01) |
| ***B32B 3/28*** | (2006.01) |
| ***B32B 9/04*** | (2006.01) |
| ***B32B 17/00*** | (2006.01) |
| ***B32B 27/36*** | (2006.01) |
| ***G06F 1/16*** | (2006.01) |
| ***G09F 9/30*** | (2006.01) |

(52) U.S. Cl.

CPC ............ *G02B 1/14* (2015.01); *G06F 1/1616* (2013.01); *G06F 1/1652* (2013.01)

(58) Field of Classification Search

CPC ....... G02B 1/14; B32B 3/08–085; B32B 3/28; B32B 2457/20; B32B 2307/536; B32B 3/10; B32B 3/14; B32B 3/18–22; G06F 1/1616; G06F 1/1652; G09F 9/301

See application file for complete search history.

(56) References Cited

U.S. PATENT DOCUMENTS

| | | | | |
|---|---|---|---|---|
| 2007/0111621 | A1* | 5/2007 | Barsoum | F41H 5/0492 428/911 |
| 2014/0305292 | A1* | 10/2014 | Gray | F41H 5/0464 89/36.02 |
| 2015/0355384 | A1* | 12/2015 | Park | G02B 1/14 428/201 |

FOREIGN PATENT DOCUMENTS

| | | |
|---|---|---|
| CN | 107263949 A | 10/2017 |

* cited by examiner

*Primary Examiner* — Frank J Vineis
*Assistant Examiner* — Nicole T Gugliotta
(74) *Attorney, Agent, or Firm* — HDLS IPR SERVICES; Chun-Ming Shih

(57) ABSTRACT

A protection film structure with composite hardening layer includes a transparent substrate and at least two tiling layers. The at least two tiling layers includes a first tiling layer, which is arranged on one face of the transparent substrate and includes a plurality of first tiling islands with a gap therebetween, and a second tiling layer, which is arranged on one face of the first tiling layer away from the transparent substrate and includes a plurality of second tiling islands with a gap therebetween. At least one composite hardening layer is arranged between the adjacent tiling layers, and each composite hardening layer includes a first hardening layer and a second hardening layer made from different materials and the material hardness of the first hardening layer is larger than the material hardness of the second hardening layer.

14 Claims, 6 Drawing Sheets

PROTECTION FILM STRUCTURE WITH COMPOSITE HARDENING LAYER

BACKGROUND

Technical Field

The present invention relates to a protection film structure, especially to a protection film structure with composite hardening layer.

Description of Related Art

Flexible and foldable display are widely used in various applications such as mobile phones, e-books, electronic posters, electronic labels because of lightweight and the capability to attach to curved objects. Traditional display may use protective glass to protect it from being damaged by external forces. However, traditional protective glass is rigid and lacks of bending ability. The protection of flexible display becomes an important issue because the traditional protective glass cannot be used for flexible display. The traditional technologies for protecting flexible display can be classified into two categories below. The first way is to use transparent plastic materials (such as transparent PI, PET) coated with hard coating on surface thereof to replace the traditional protective glass, where the material of the hard coating is generally glass-like materials such as silicon oxide. However, the first technology has poor effect because the plastic material is soft and easy to collapse when contacting foreign objects, which will cause the breakage of surface hard coating. The second way exploits the bendable characteristics of ultra-thin glass to protect flexible display and the ultra-thin glass is currently used for foldable smart phone. However, the production, processing, post-production and yield of ultra-thin glass are poor to cause increased product costs. Besides, a layer of plastic material is required to attach to the surface of the ultra-thin glass to absorb shock and serve as a protective layer therefor because the ultra-thin glass tends to break by impact. This cumbersome traditional architecture causes that the surface of the flexible display has insufficient hardness and has traces when scratched by foreign objects, thus influence display effect. To overcome the disadvantages of the above-mentioned prior art, this present patent intends to provide a hardening layer with crack-resisting ability on a flexible surface, where global chipping will not happen when it is scratched by foreign objects to ensure surface hardness and screen protection.

FIG. 1 shows a schematic diagram of a related art electronic product 100' with a foldable display screen in folded status. The electronic product 100' is, for example, a smartphone with a foldable display screen or an e-book apparatus with electronic paper. FIG. 2 shows a partial cross-sectional view of the electronic product 100' with a foldable display screen. As shown in FIG. 2, the electronic product 100' has, from top to bottom with reference to normal operation orientation, at least a protective layer 10', a touch layer 20' and a flexible (or foldable) display screen 30'. This protective layer 10' is required to have sufficient hardness to provide scratch resistance, and the transparency of the protective layer 10' is preferably greater than 70%. As the material hardness or the thickness of the protective layer 10' becomes larger, the more likely the protective layer 10' has risk of breaking when the electronic product 100' is bent or folded. FIGS. 3A and 3B are schematic views for explaining the cracking problem of the protective layer 10' when the electronic product 100' is bent or folded. As shown in those figures, the protective layer 10' in prior art electronic product 100' generally lacks of sufficient flexibility because the material hardness or the thickness of the protective layer 10' should be larger enough to resist scratch. This causes the protective layer 10' to break when the electronic product 100' is bent or folded. Accordingly, the touch layer 20' below the protective layer 10' may also have internal breakage. In a worse scenario, the display screen may also be damaged to cause degraded display of the electronic product 100' or erroneous operation. On the contrary, the material hardness or the thickness of the protective layer 10' for related art flexible (or foldable) display screen 30' may be reduced to enhance the flexibility. However, the hardness will be insufficient to cause fragmentation and scratching problems when foreign objects contact with the protective layer 10'.

The object of the present invention is to solve the above problems by providing tiling layers with a gap therebetween and composite hardening layer between two adjacent tiling layers. The provision of the composite hardening layer can provide sufficient hardness for the protection film structure and the gap of the tiling layers can provide extension space for the composite hardening layer when it is pressed.

SUMMARY

Accordingly, the object of the present invention is to provide a protection film structure with composite hardening layer, the protection film structure includes a transparent substrate having a first face and a second face; at least two tiling layers comprising: a first tiling layer arranged on one side of the first face of the transparent substrate and comprising a plurality of first tiling islands, two adjacent ones of the first tiling islands having a gap therebetween; a second tiling layer arranged on one face of the first tiling layer away from the transparent substrate and comprising a plurality of second tiling islands, two adjacent ones of the second tiling islands having a gap therebetween; and at least one composite hardening layer arranged between the adjacent tiling layers, and the composite hardening layers comprising a first hardening layer and a second hardening layer made from different materials, wherein a material hardness of the first hardening layer is larger than a material hardness of the second hardening layer.

According to an embodiment of the present invention, one of the second tiling islands of the second tiling layer is at least partially overlapped with at least one of the first tiling islands of the first tiling layer along a projection direction. Moreover, one of the second tiling islands of the second tiling layer is at least partially overlapped with at least two or three different first tiling islands of the first tiling layer along a projection direction.

According to another embodiment of the present invention, the protection film structure further includes a third tiling layer arranged on one side of the second tiling layer away from the first tiling layer, the third tiling layer includes a plurality of third tiling islands, two adjacent ones of the third tiling islands have a gap therebetween, one of the third tiling islands of the third tiling layer is at least partially overlapped with at least one second tiling island of the second tiling layer along a projection direction.

According to still another embodiment of the present invention, the areas of the first tiling islands and the second tiling islands are respectively not less than 250 square micrometers and are not more than 50 square millimeters respectively.

According to still another embodiment of the present invention, one of the composite hardening layers includes three hardening layers.

According to still another embodiment of the present invention, the protection film structure further includes at least one additional hardening layer arranged between the transparent substrate and the first tiling layer.

According to still another embodiment of the present invention, the protection film structure further includes an outer hardening layer arranged on a side of the tiling layer most away from the transparent substrate and the side being opposite to the transparent substrate, the outer hardening layer has a hardness greater than pencil hardness 6H. The outer hardening layer is for example a silicon nitride hardening layer with thickness less than 1 um.

According to still another embodiment of the present invention, the tiling layers are made of organic material and have thickness not less than 0.5 um.

The organic material is acrylic material or photosensitive polyimide.

According to still another embodiment of the present invention, the transparent substrate is a polymer material substrate or an ultra-thin glass substrate with thickness not more than 200 μm.

DETAILED DESCRIPTION

Figure 1:
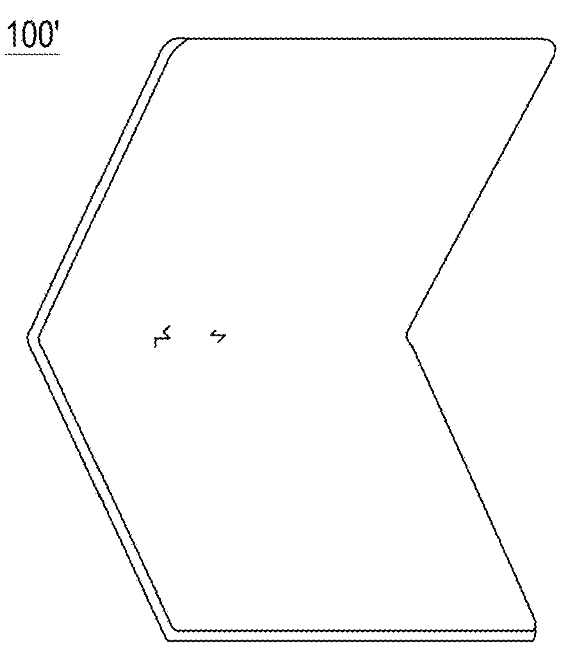
FIG. 1 shows a schematic diagram of a related art electronic product with a foldable display screen in folded status.
Figure 2:
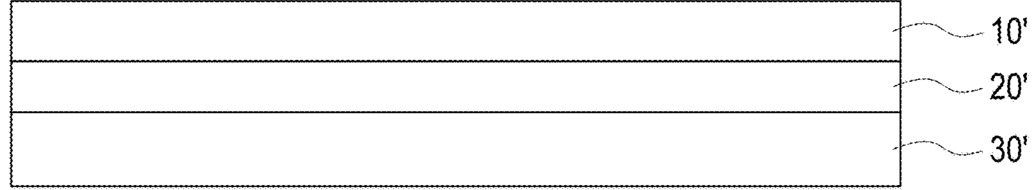
FIG. 2 shows a partial cross-sectional view of the related art electronic product with a foldable display screen.
Figure 3A:
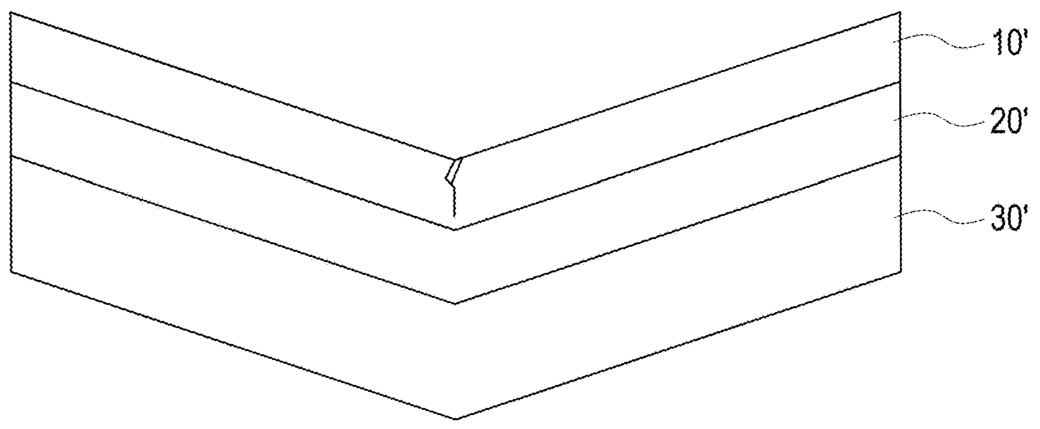
FIGS. 3A and 3B are schematic views for explaining the cracking problem of the protective layer when the related art electronic product is bent or folded.
Figure 3B:
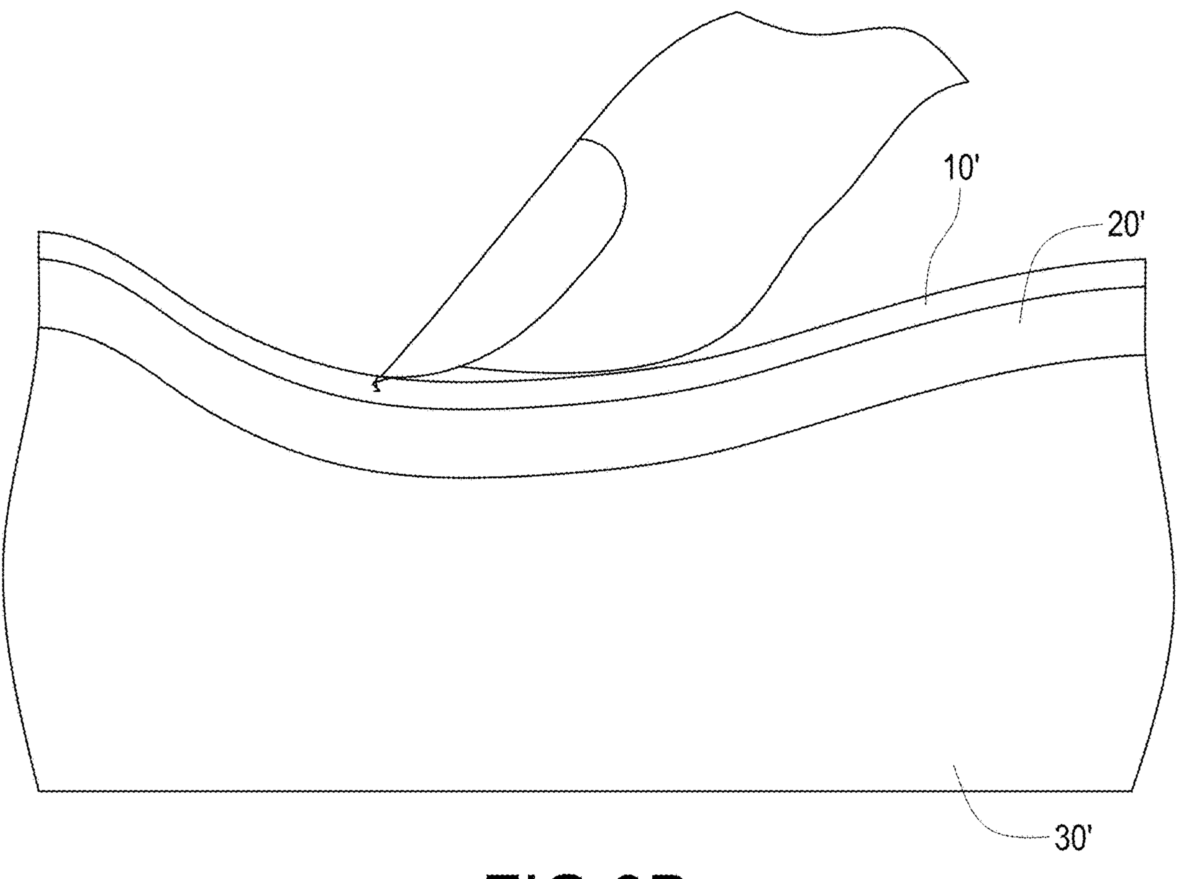

It is to be understood that the terms for indicating positions and the location relation, for example "front", "rear", "left", "right", "front end", "rear end", "distal end", "longitudinal direction", "lateral direction", "vertical direction", "top" and "bottom", are based on the positions and the location relation disclosed in the drawings, and only used for disclosing the present invention used for indicating or implying the specified location of the device or the components or the specified structure and operation in certain location, thus the present disclosure is not intended to be limiting.

For example, the terms of "first", "second", "third", "forth" and "fifth" are used for illustrating each unit, component, area, layer and/or part. The component, the unit, the area, the layer and/or the part are not limited by the terms. These terms are only used for separating the element, the assembly, the area, the layer, or the part. Unless being clearly indicated according to the whole specification, the terms for example "the first", "the second", "the third", "the fourth" and "the fifth" are not used for implying the order or sequence.

The technical contents of the present invention will become apparent with the detailed description of embodiments and the accompanied drawings as follows. However, it shall be noted that the accompanied drawings are for illustrative purposes only such that they shall not be used to restrict the scope of the present invention.

Figure 4:
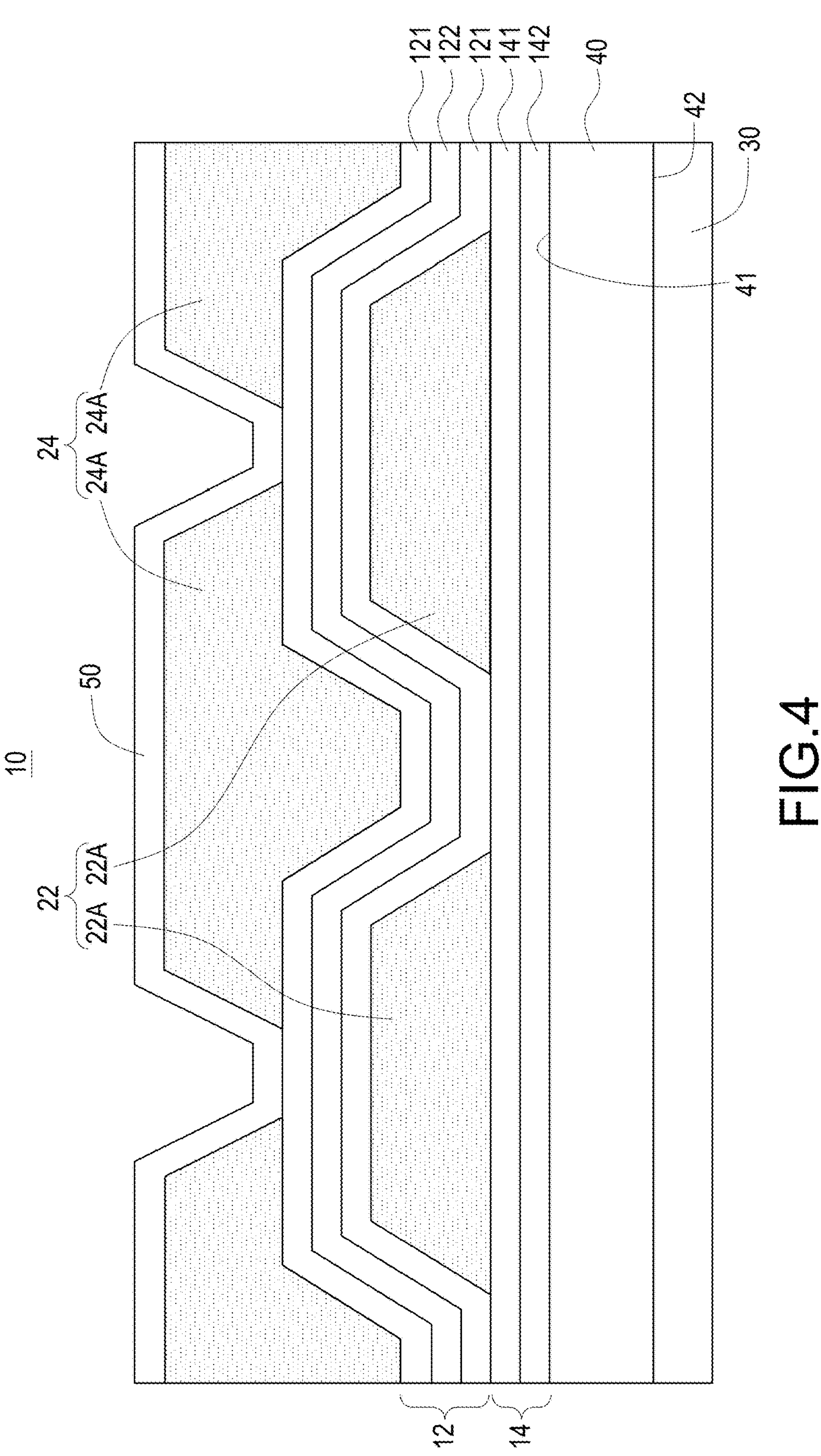
FIG. 4 shows a cross-sectional view of the protection film structure according to one embodiment of the present invention.

FIG. 4 shows a cross-sectional view of the protection film structure 10 according to one embodiment of the present invention. The protection film structure 10 includes, for example from top to bottom with reference to normal operation orientation, an outer hardening layer 50, a second tiling layer 24, a first composite hardening layer 12, a first tiling layer 22, a second composite hardening layer 14 and a transparent substrate 40, and the protection film structure 10 is arranged on a display screen 30. The above "from top to bottom" direction is referred to the normal orientation of the electronic product (such as a smart phone) with the composite hardening layer in usual operation. Namely, the user finger is on the top side, and the display screen 30 of the smartphone is on the bottom side. However, the above definitions are only used to illustrate an exemplary direction of the technical features of the present invention, and are not intended to limit the scope of the present invention.

As shown in FIG. 4, the first tiling layer 22 includes a plurality of first tiling islands 22A. According to an embodiment of the present invention, the first tiling islands 22A may be, for example, island-shaped convex blocks with a trapezoidal cross-section, and the width of the upper base of each first tiling island 22A is smaller than the width of the lower base of each first tiling island 22A. Furthermore, the first tiling islands 22A have a gap therebetween to define a first notch between two adjacent first tiling islands 22A. Similarly, the second tiling layer 24 includes a plurality of second tiling islands 24A. According to an embodiment of the present invention, the second tiling islands 24A may be, for example, island-shaped convex blocks with a trapezoidal cross-section, and the width of the upper base of each second tiling island 24A is smaller than the width of the lower base of each second tiling island 24A. Furthermore, the second tiling islands 24A have a gap therebetween to define a second notch between two adjacent second tiling islands 24A. The above-mentioned first tiling islands 22A and the second tiling islands 24A are made of organic materials and their thickness is not less than 0.5 micrometers (μm). The organic material is, for example, an acrylic material or a photosensitive polyimide. Besides, the shapes of the first tiling island 22A and the second tiling island 24A of the present invention are not limited to the above-mentioned exemplary shapes. Any shape of the first tiling island 22A and the second tiling island 24A may be applicable as long as a notch is formed between the adjacent first tiling islands 22A and between the adjacent second tiling islands 24A.

The first composite hardening layer 12 includes, for example, a first hardening layer 121, a second hardening layer 122, and a first hardening layer 121 from top to bottom. Besides, the second composite hardening layer 14 includes, from top to bottom, a first hardening layer 141 and a second hardening layer 142.

In the embodiment shown in FIG. 4, the first hardening layers 121 and 141 may be, for example, silicon nitride material (SiNx) and have a hardness greater than 6H (ie, pencil hardness 6H); and the second hardening layers 122 and 142 may be, for example, silicon oxide material (SiOx) with a hardness greater than 3H (ie pencil hardness 3H) or an acrylic material with a hardness greater than 1H (ie pencil hardness 1H). Besides, in the first composite hardening layer 12 and the second composite hardening layer 14 shown in FIG. 4, the hardness difference between two adjacent hardening layers (between the first hardening layer 121 and the second hardening layer 122, or between the first hardening layer 141 and the second hardening layer 142) is preferable not smaller than pencil hardness 3H. Besides, the hardness of the first hardening layer 121 (141) is larger than the hardness of the second hardening layer 122 (142).

In addition, in the embodiment shown in FIG. 4, the transparent substrate 40 has a first surface 41 and a second surface 42. The transparent substrate 40 is, for example, a polymer material substrate. The polymer material substrate may be a PI (polyimide) substrate or a PET (polyethylene terephthalate) substrate. Furthermore, the transparent substrate 40 may also be an ultra-thin glass substrate, and the thickness thereof is, for example, not more than 200 μm. The outer hardening layer 50 is arranged on the side of the tiling layer (the tiling layer most away from the transparent substrate 40) opposite to the transparent substrate 40. Namely, the side of the second tiling layer 24 opposite to the transparent substrate 40 as shown in FIG. 4. According to an embodiment of the present invention, the outer hardening layer 50 is a hardening layer with hardness larger than 6H and, for example, is a silicon nitride hardening layer with thickness less than 1 um. With reference to FIG. 4 again, at least one composite hardening layer is sandwiched between adjacent tiling layers, namely, at least one first composite hardening layer 12 is sandwiched between the first tiling layer 22 and the second tiling layer 24. Besides, according to one embodiment of the present invention, the thickness of the first tiling layer 22 is larger than the thickness of the first composite hardening layer 12 to form a first notch with sufficient depth such that the first composite hardening layer 12 has sufficient extension in the first notch.

Figure 5:
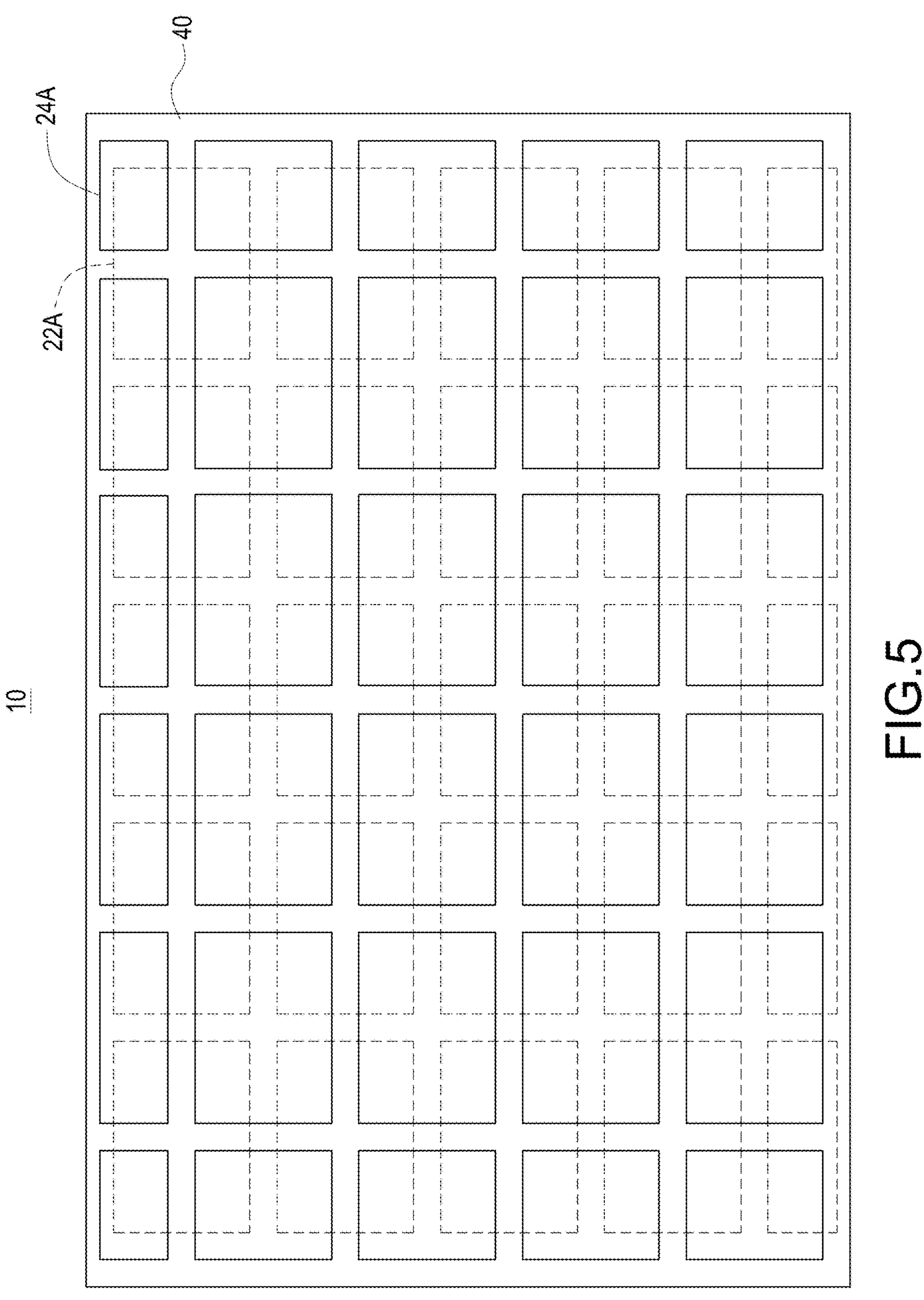
FIG. 5 shows a top view corresponding to the embodiment shown in FIG. 4.

FIG. 5 shows a top view corresponding to the embodiment shown in FIG. 4, where a second tiling island 24A of the second tiling layer 24 is at least partially overlapped with at least one first tiling island 22A of the first tiling layer 22 along a projection direction (from top to bottom direction). More particularly, at least a partial region of a second tiling island 24A of the second tiling layer 24 is overlapped with a partial region of at least one first tiling island 22A of the first tiling layer 22 along a projection direction. For example, as shown in FIG. 5, one second tiling island 24A of the second tiling layer 24 is partially overlapped with four different first tiling islands 22A of the first tiling layer 22 along a projection direction. However, the scope of the present invention is not limited to the embodiment shown in FIG. 5. According to an embodiment of the present invention, a second tiling island 24A of the second tiling layer 24 is partially overlapped with at least two different first tiling islands 22A of the first tiling layer 22 along the projection direction. According to another embodiment of the present invention, one second tiling island 24A of the second tile layer 24 is partially overlapped with at least three different first tiling islands 22A of the first tiling layer 22 along the projection direction. In other words, as long as one second tile island 24A of the second tile layer 24 is partially overlapped with at least one first tiling island 22A of the first tile layer 22, or partially overlapped with two different first tiling islands 22A of the first tile layer 22 in the projection direction, the required effect of the present invention can be achieved. Besides, in FIG. 5, the shape of the first tiling islands 22A and the second tiling islands 24A are rectangular along projection direction is only for demonstration, and this is not intended to limit the scope of the present invention. In other words, the shape of the first tiling islands 22A and the second tiling islands 24A are rectangular along projection direction can be other shapes such as triangular, circular, or various polygons.

Please refer to FIGS. 4 and 5 again, the tiling islands 22A have a gap therebetween to define a first notch between the two adjacent tiled islands 22A, and the tiling islands 24A have a gap therebetween to define a second notch between the two adjacent tiled islands 24A. As shown in FIG. 4, part of the first composite hardening layer 12 has downward extension due to the first notch. Besides, a second tiling island 24A of the second tiling layer 24 is at least partially overlapped with at least one first tiling island 22A of the first tiling layer 22 along a projection direction. Furthermore, the material of the first tiling island 22A and the second tiling island 24A is softer than the material of the first hardening layer 121 (141) and the second hardening layer 122 (142). Therefore, when the protection film structure is pressed by external force, for example pressed by an external force exerted from top toward bottom direction, the first composite hardening layer 12 can extend downward through the first notch to avoid cracking thereof. Besides, when the protection film structure is pressed by external force exerted from bottom toward top direction, the first composite hardening layer 12 can be advantageously extended upward because it has downward extension portion, thus prevent the cracking thereof.

Figure 6:
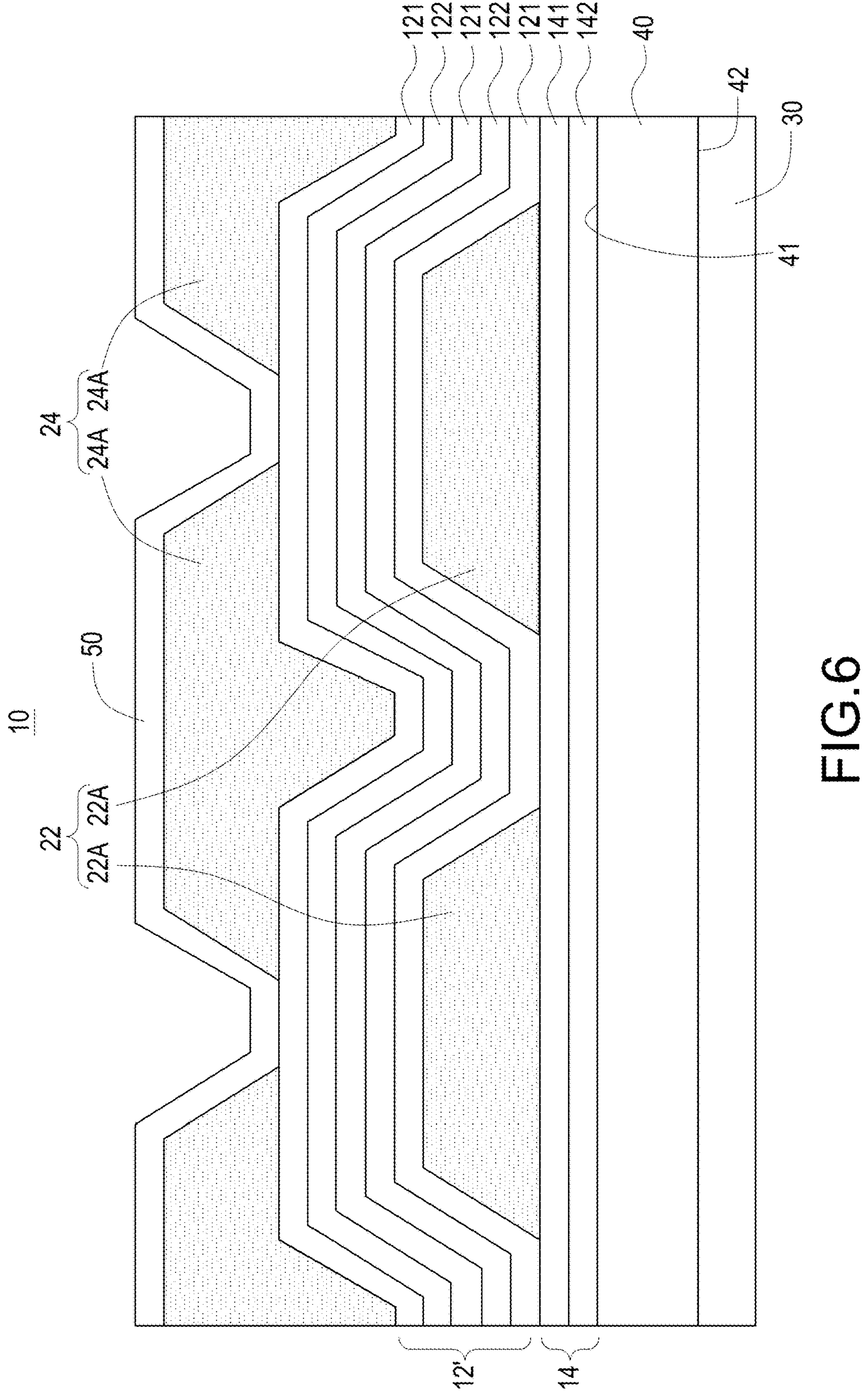
FIG. 6 shows a cross-sectional view of a protection film structure according to another embodiment of the present invention.

FIG. 6 shows a cross-sectional view of a protection film structure 10 according to another embodiment of the present invention. The protection film structure 10 also includes, for example from top to bottom with reference to normal operation orientation, an outer hardening layer 50, a second tiling layer 24, a first composite hardening layer 12', a first tiling layer 22, a second composite hardening layer 14 and a transparent substrate 40. The embodiment in FIG. 6 is different with the embodiment in FIG. 4 in that the first composite hardening layer 12' includes five layers of hardening layers, namely, from top to bottom, the first hardening layer 121, the second hardening layer 122, the first hardening layer 121 the second hardening layer 122, and the first hardening layer 121. By providing more layers of hardening layer, the structural strength of the protection film structure 10 is enhanced. Similarly, the first tiling islands 22A have a gap therebetween to define a first notch between two adjacent first tiling islands 22A; the second tiling islands 24A have a gap therebetween to define a second notch between two adjacent second tiling islands 24A. The first tile island block 22A and the second tile island block 24A are made of organic material and have a thickness of not less than 0.5 micrometers (μm). The organic material is, for example, an acrylic material or a photosensitive polyimide.

Furthermore, the top view of the embodiment of FIG. 6 can also be the same as that shown in FIG. 5. Namely, a second tiling island 24A of the second tiling layer 24 is at least partially overlapped with at least one first tiling island 22A of the first tiling layer 22 along a projection direction (from top to bottom direction). For example, as shown in FIG. 5, one second tiling island 24A of the second tiling layer 24 is partially overlapped with four different first tiling islands 22A of the first tiling layer 22 along a projection direction. However, the scope of the present invention is not limited to the embodiment shown in FIG. 5. According to an embodiment of the present invention, a second tiling island 24A of the second tiling layer 24 is partially overlapped with at least two different first tiling islands 22A of the first tiling layer 22 along the projection direction. According to another embodiment of the present invention, one second tiling island 24A of the second tile layer 24 is partially overlapped with at least three different first tiling islands 22A of the first tiling layer 22 along the projection direction. In other words, as long as one second tile island 24A of the second tile layer 24 is partially overlapped with at least one first tiling island 22A of the first tile layer 22, or partially overlapped with two different first tiling islands 22A of the first tile layer 22 in the projection direction, the required effect of the present invention can be achieved. Besides, in FIG. 5, the shape of the first tiling islands 22A and the second tiling islands 24A being rectangular along projection direction is only for demonstration, and this is not intended to limit the scope of the present invention. In other words, the shape of the first tiling islands 22A and the second tiling islands 24A are rectangular along projection direction can be other shapes such as triangular, circular, or various polygons.

Please refer to FIGS. 6 and 5 again, the tiling islands 22A have a gap therebetween to define a first notch between the two adjacent tiling islands 22A, and the tiling islands 24A have a gap therebetween to define a second notch between the two adjacent tiling islands 24A. As shown in FIG. 6, part of the first composite hardening layer 12' has downward extension due to the first notch. Besides, a second tiling island 24A of the second tiling layer 24 is at least partially overlapped with at least one first tiling island 22A of the first tiling layer 22 along a projection direction. Furthermore, the material of the first tiling island 22A and the second tiling island 24A is softer than the material of the first hardening layer 121 (141) and the second hardening layer 122 (142). Therefore, when the protection film structure is pressed by external force, for example pressed by an external force exerted from top toward bottom direction, the first composite hardening layer 12' can extend downward through the first notch to avoid cracking thereof. Besides, when the protection film structure is pressed by external force exerted from bottom toward top direction, the first composite hardening layer 12' can be advantageously extended upward because it has downward extension portion, thus prevent the cracking thereof.

Figure 7:
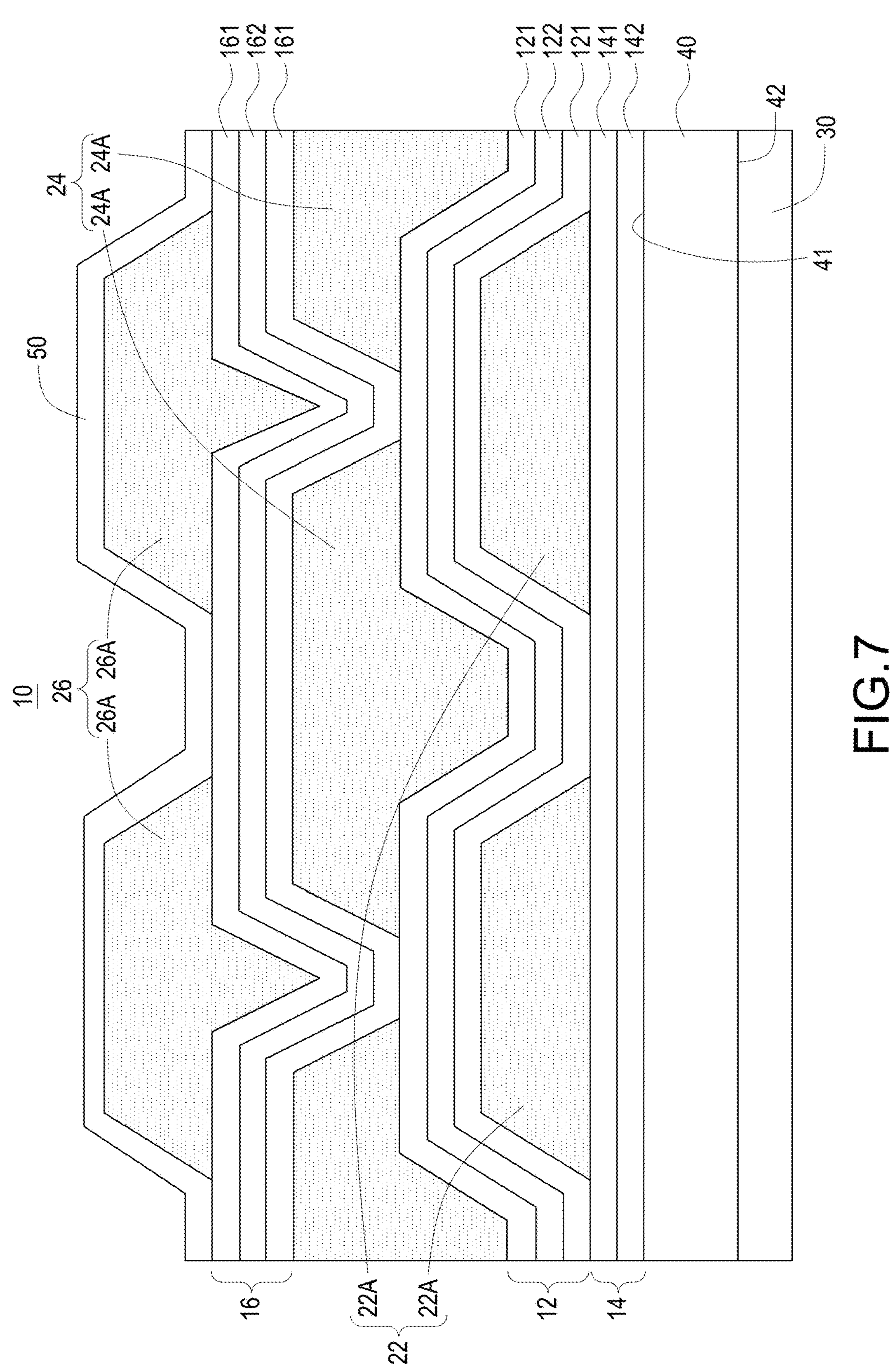
FIG. 7 shows a cross-sectional view of a protection film structure 10 according to still another embodiment of the present invention.

FIG. 7 shows a cross-sectional view of a protection film structure 10 according to still another embodiment of the present invention. The protection film structure 10 includes, for example from top to bottom with reference to normal operation orientation, an outer hardening layer 50, a third tiling layer 26, a third composite hardening layer 16, a second tiling layer 24, a first composite hardening layer 12, a first tiling layer 22, a second composite hardening layer 14 and a transparent substrate 40.

The third tiling layer 26 includes a plurality of third tiling islands 26A. According to an embodiment of the present invention, the third tiling islands 26A may be, for example, island-shaped convex blocks with a trapezoidal cross-section, and the width of the upper base of each third tiling island 26A is smaller than the width of the lower base of each third tiling island 26A. Furthermore, the third tiling islands 26A have a gap therebetween to define a third notch between two adjacent third tiling islands 26A. The above-mentioned third tiling islands 26A are made of organic materials and their thickness is not less than 0.5 micrometers (μm). The organic material is, for example, an acrylic material or a photosensitive polyimide. Besides, the shapes of the third tiling island 26A of the present invention are not limited to the above-mentioned exemplary shapes. Any shape of the third tiling islands 26A may be applicable as long as a notch is formed between the adjacent third tiling islands 26A.

The third composite hardening layer 16 includes, for example, a first hardening layer 161, a second hardening layer 162, and a first hardening layer 161 from top to bottom. In the embodiment shown in FIG. 7, the first hardening layer 161 may be, for example, silicon nitride material (SiNx) and have a hardness greater than 6H (namely, pencil hardness 6H); and the second hardening layer 162 may be, for example, silicon oxide material (SiOx) with a hardness greater than 3H (namely, pencil hardness 3H) or an acrylic material with a hardness greater than 1H (ie pencil hardness 1H). Besides, in the third composite hardening layer 16 shown in FIG. 7, the hardness difference between two adjacent hardening layers (namely, between the first hardening layer 161 and the second hardening layer 162) is preferable not smaller than pencil hardness 3H. Besides, the hardness of the first hardening layer 161 is larger than the hardness of the second hardening layer 162.

Please refer to FIGS. 7 and 5 again, the tiling islands 22A have a gap therebetween to define a first notch between the two adjacent tiling islands 22A, and the tiling islands 24A have a gap therebetween to define a second notch between the two adjacent tiling islands 24A. As shown in FIG. 7, part of the first composite hardening layer 12 has downward extension due to the first notch. Besides, part of the third composite hardening layer 16 has downward extension due to the second notch. Besides, a second tiling island 24A of the second tiling layer 24 is at least partially overlapped with at least one first tiling island 22A of the first tiling layer 22 along a projection direction; a third tiling island 26A of the third tiling layer 26 is at least partially overlapped with at least one second tiling island 24A of the second tiling layer 24 along a projection direction.

Furthermore, the material of the first tiling island 22A, the second tiling island 24A and the third tiling island 26A is softer than the material of the first hardening layer 121 (141, 161) and the second hardening layer 122 (142, 162). Therefore, when the protection film structure is pressed by external force, for example pressed by an external force exerted from top toward bottom direction, the first composite hardening layer 12 can extend downward through the first notch and the third composite hardening layer 16 can extend downward through the second notch to avoid cracking thereof. Besides, when the protection film structure is pressed by external force exerted from bottom toward top direction, the first composite hardening layer 12 and the third composite hardening layer 16 can be advantageously extended upward because they have downward extension portions, thus prevent the cracking thereof. In above embodiments, the areas of the first tiling islands 22A and the second tiling islands 24A are respectively not less than 250 square micrometers and not more than 50 square millimeters respectively.

It shall be understood that the present invention may have other types of embodiments, and a person with ordinary skills in the art of the technical field of the present invention may make various changes and modifications corresponding to the present invention without deviating the principle and substance of the present invention; however, such corresponding changes and modification shall be within the claimed scope of the present invention.

What is claimed is:

1. A protection film structure comprising:

a transparent substrate having a first face and a second face;

at least two tiling layers comprising:

a first tiling layer arranged on one side of the first face of the transparent substrate and comprising a plurality of first tiling islands, two adjacent ones of the first tiling islands, two adjacent one of the first tiling islands having a gap between;

a second tiling layer arrange on one face of the first tiling layer away from the transparent substrate and comprising a plurality of second tiling islands, two adjacent ones of the second tiling islands having a gap therebetween; and at least one composite hardening layer arranged between the adjacent tiling layers, and the composite hardening layers comprising:

a first hardening layer, wherein the first hardening layer is silicon nitride (SiNx), and a second hardening layer made from a different material than the first hardening layer, wherein a material hardness of the first hardening layer is larger than a material hardness of the second hardening layer.

2. The protection film structure in claim 1, wherein one of the second tiling islands of the second tiling layer is at least partially overlapped with at least one of the first tiling islands of the first tiling layer along a projection direction.

3. The protection film structure in claim 2, wherein one of the second tiling islands of the second tiling layer is at least partially overlapped with at least two different first tiling islands of the first tiling layer along a projection direction.

4. The protection film structure in claim 2, wherein one of the second tiling islands of the second tiling layer is at least partially overlapped with at least three different first tiling islands of the first tiling layer along a projection direction.

5. The protection film structure in claim 2, further comprising a third tiling layer arranged on one side of the second tiling layer away from the first tiling layer, the third tiling layer comprising a plurality of third tiling islands, two adjacent ones of the third tiling islands having a gap therebetween, one of the third tiling islands of the third tiling layer is at least partially overlapped with at least one second tiling island of the second tiling layer along a projection direction.

6. The protection film structure in claim 2, wherein areas of the first tiling islands and the second tiling islands are respectively not less than 250 square micrometers.

7. The protection film structure in claim 2, wherein areas of the first tiling islands and the second tiling islands are not more than 50 square millimeters respectively.

8. The protection film structure in claim 1, wherein one of the composite hardening layers comprises three hardening layers.

9. The protection film structure in claim 1, further comprising at least one additional hardening layer arranged between the transparent substrate and the first tiling layer.

10. The protection film structure in claim 1, further comprising an outer hardening layer arranged on a side of the tiling layer most away from the transparent substrate and the side being opposite to the transparent substrate, the outer hardening layer has a hardness greater than pencil hardness 6H.

11. The protection film structure in claim 10, wherein the outer hardening layer is a silicon nitride hardening layer with thickness less than 1 micrometer.

12. The protection film structure in claim 1, wherein the tiling layers are made of organic material and have thickness not less than 0.5 micrometers.

13. The protection film structure in claim 12, wherein the organic material is acrylic material or photosensitive polyimide.

14. The protection film structure in claim 1, wherein the transparent substrate is a polymer material substrate or an ultra-thin glass substrate with thickness not more than 200 micrometers.

* * * * *